(12) United States Patent
Dobrilovic (10) Patent No.: US 12,491,006 B2
(45) Date of Patent: Dec. 9, 2025

(54) METHOD AND DEVICE FOR SAFE PERCUTANEOUS PERICARDIAL DRAINAGE

(71) Applicant: Nikola Dobrilovic, Boston, MA (US)

(72) Inventor: Nikola Dobrilovic, Boston, MA (US)

(73) Assignee: Nikola Dobrilovic, LLC, Chicago, IL (US)

( * ) Notice: Subject to any disclaimer, the term of this patent is extended or adjusted under 35 U.S.C. 154(b) by 1108 days.

(21) Appl. No.: 17/487,295

(22) Filed: Sep. 28, 2021

(65) Prior Publication Data

US 2022/0110657 A1     Apr. 14, 2022

Related U.S. Application Data

(63) Continuation-in-part of application No. 16/677,817, filed on Nov. 8, 2019, now abandoned.

(51) Int. Cl.
*A61B 17/34* (2006.01)
*A61B 17/00* (2006.01)
*A61M 25/09* (2006.01)

(52) U.S. Cl.
CPC ... *A61B 17/3468* (2013.01); *A61M 25/09041* (2013.01); *A61B 2017/00566* (2013.01); *A61B 2017/3482* (2013.01); *A61M 2210/122* (2013.01)

(58) Field of Classification Search
CPC ...... A61B 17/3468; A61B 2017/00566; A61B 2017/3482; A61M 25/09041; A61M 2210/122
See application file for complete search history.

(56) References Cited

U.S. PATENT DOCUMENTS

| | | | |
|---|---|---|---|
| 2004/0167558 A1* | 8/2004 | Igo | A61B 17/3478 606/185 |
| 2013/0150877 A1 | 6/2013 | Ikeda | |
| 2020/0008678 A1* | 1/2020 | Barbagli | A61B 5/0066 |

\* cited by examiner

*Primary Examiner* — Ashley L Fishback
(74) *Attorney, Agent, or Firm* — Hinckley Allen & Snyder; Stephen Holmes (57) ABSTRACT

A safe, reliable, reproducible system and method for entry into the pericardial sac. The method and system described generally includes penetration of the subcutaneous tissue with a guide sheath or a relatively blunt stylet contained within a sheath. The stylet is removed from the sheath and a vacuum mechanism is installed. Once in contact with the pericardium, the sheath is engaged with the pericardial tissue, allowing the vacuum mechanism to draw the pericardium away from the heart to create a greater space between the heart and pericardium allowing needle insertion onto the pericardial cavity in a much safer and controlled manner.

2 Claims, 11 Drawing Sheets

METHOD AND DEVICE FOR SAFE PERCUTANEOUS PERICARDIAL DRAINAGE

CROSS-REFERENCE TO RELATED APPLICATIONS

This application is related to and claims priority from earlier filed U.S. patent application Ser. No. 16/677,817, filed Nov. 8, 2019.

FIELD OF THE INVENTION

The present disclosure relates generally to a percutaneous access system that allows capture of the pericardial sac for the purpose of entry to the interstitial space allowing fluid drainage and drain placement. More particularly, the present disclosure provides a safe method and device that is specifically designed to allow entry through the pericardial sac while minimizing the chance of injury to the heart.

BACKGROUND OF THE INVENTION

Figure 1:
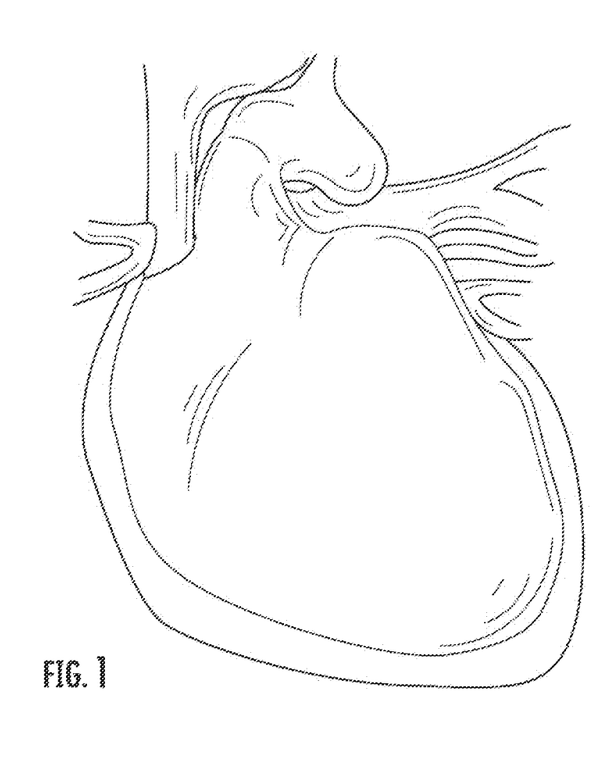
FIG. 1 is an illustration of a heart and the pericardium.

The pericardium is a tough double layered sac covering the heart. The pericardial sac consists of two layers, the outer fibrous pericardium and the inner serous pericardium and a space therebetween filled with serous fluid, which serves to protect the heart, see FIG. 1. When conditions arise such that there is excess fluid or swelling within the pericardial sac, there is need to insert a needle or place a drain to withdraw fluid and reduce the pressure to prevent hemodynamic compromise and to allow the heart to function normally. Drainage of pericardial fluid is the most common clinical application of percutaneous pericardial entry, though, other applications exist.

Figure 2:
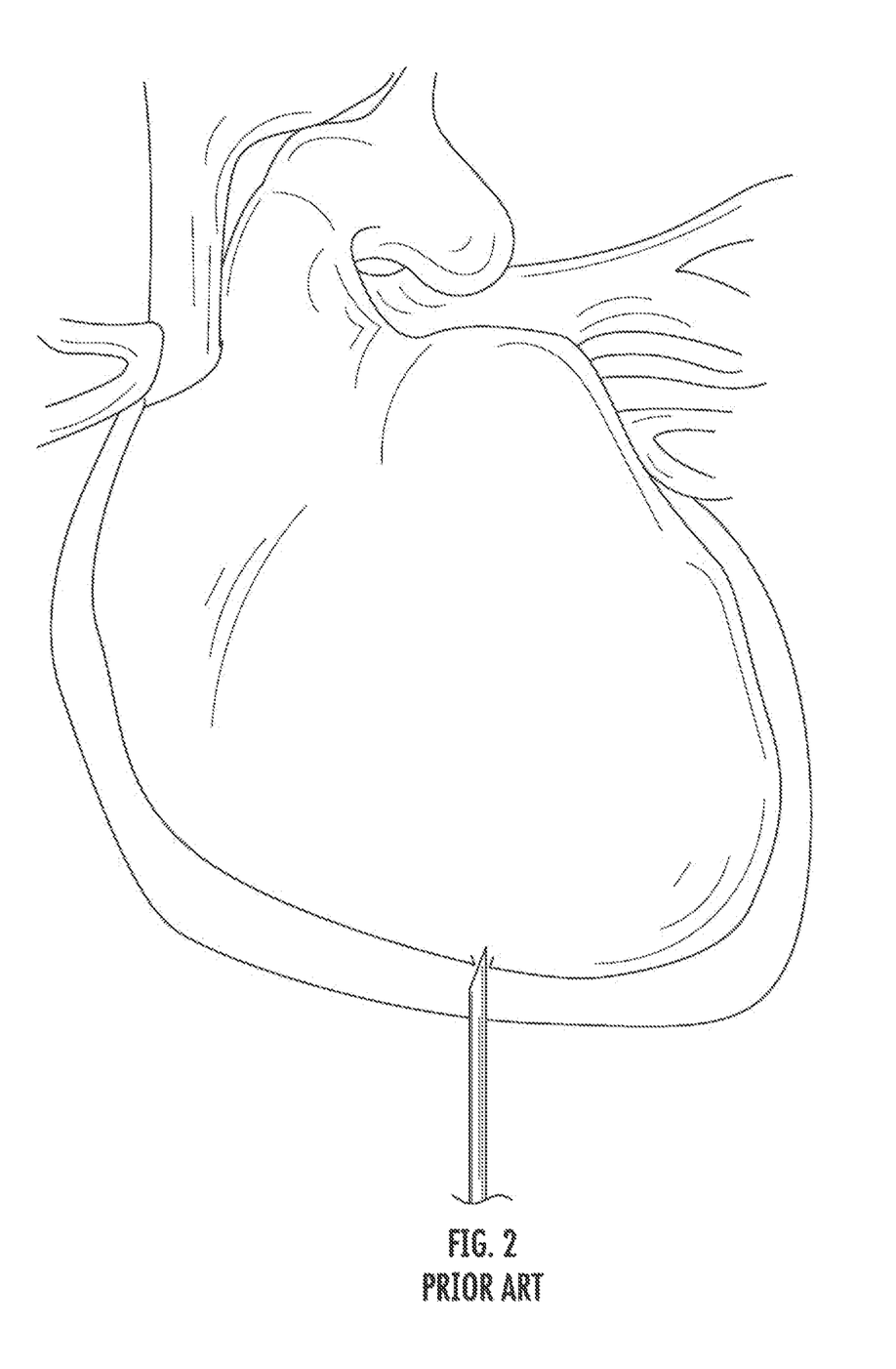
FIG. 2 illustrates the prior art method of gaining entry to the pericardium for drainage.

Prior art drainage of the pericardial sac consists of a standard medical technique, a version of the modified Seldinger technique, by which a large bore needle, as shown at FIG. 2, is inserted through the skin and subcutaneous tissues, directing the needle, toward and hopefully, into the pericardial sac but without over penetrating and thereby injuring the heart contained therein. Once pericardial fluid and/or blood is aspirated, a wire is then passed through the needle and into the pericardial sac. This wire is then used as a guide to allow a rigid plastic dilator to be placed over the wire, creating a tract for subsequent drain placement. The drain is then inserted, also using the wire as a guide, as well as sometimes using a plastic sheath. Once the drain is in proper position within the pericardial sac, it can remain in place for a prolonged period of time (usually days), during which time it will continue to prevent fluid from accumulating within the pericardium, while posing minimal to no risk of trauma to the heart as it remains in place. Aspiration of clear fluid through the needle is generally used as an indication that the correct space has been entered. However, blood is very often the fluid that is contained within the pericardial sac requiring drainage. Aspiration of blood is less informative and often worrisome as an indicator, since it may represent needle trauma to the heart.

In emergency situations, the needle and subsequent drain often must be inserted blindly. In such an emergency setting, a patient may require that this procedure be performed immediately as a life-saving measure. As a result, the procedure becomes exponentially more dangerous as it must be performed blindly, under poor conditions, and regardless of degree of risk, as the risk of not intervening is considered lethal.

Under elective conditions, the use of imaging helps to make the procedure much safer than blind attempts to access the pericardium (which would be considered extremely unsafe by current standards for an elective procedure). Ultrasound or fluoroscopy imaging is usually employed in order to assist in directing the needle angle and depth.

Though elective, percutaneous drainage of pericardial fluid is the current clinical standard, the procedure is often not delivered to patients. Physicians often decline to perform it due to an appropriate fear of possibly causing injury to the heart. Without the option for percutaneous drainage, the patient is then subjected to a different profile of risks, either that of a much larger surgical procedure (with its own associated surgical risks) or the risk associated with not draining a pericardial fluid collection that has already been determined to need drainage.

While the described percutaneous method is much less invasive, more comfortable for the patient, and much less costly, the potential exists for causing grave injury to the heart as a large needle is aimed directly at the heart with the hope that the needle can be advanced precisely far enough to enter the pericardial sac but not so far that the needle enters or injures the heart itself (or severs a coronary artery). The use of ultrasound and fluoroscopy as imaging techniques, do not eliminate risk of cardiac injury. Even under the best circumstances, the heart itself is constantly moving, vigorously beating within the confined space of the pericardial sac.

If there is a larger volume of fluid collection specifically "in line," positioned between the needle access point and the heart, there is more room for over-penetration by the needle and, therefore, less risk associated with the procedure. However, no such procedure is without risk to the patient. Often the fluid collection is small, or similarly, small specifically at the location that the needle can access. Risk of needle trauma to the heart is the most significant limiting factor to this procedure. In patients receiving the procedure, the potential for cardiac injury is the single factor dictating most of the decision making and risk. As a result, it is the most common reason that patients do not receive the needed procedure.

Accordingly, there is a need in the medical field for a method and system that significantly reduces the risk of the current percutaneous pericardial entry technique.

BRIEF SUMMARY OF THE INVENTION

In this regard, the present invention provides a solution for the problems of the prior art by providing a safe, reliable, reproducible method for entry into the pericardial sac. The method and system described generally includes penetration of the subcutaneous tissue with a guide sheath or a relatively blunt stylet contained within a sheath. The stylet is removed from the sheath and a hook mechanism is installed. Once in contact with the pericardium, the hook is engaged with the pericardial tissue, allowing the hook mechanism to draw the pericardium away from the heart to create a greater space between the heart and pericardium allowing needle insertion into the pericardial cavity in a much safer and more controlled manner.

By design, the manner in which the hook engages the pericardium is much safer than the manner in which the large bore needle does so. First, the ability—in terms of depth—of the hook to over-penetrate the pericardium (possibly into heart) is limited to a few millimeters at most. Second, the direction of penetration is significantly (by almost 90 degrees) diverted away from the heart.

In another embodiment, vacuum is applied to the sheath when the stylet is removed. The vacuum suction draws the pericardium onto the distal end of the sheath providing a safe zone where the pericardium can be penetrated without risking damage to the heart itself.

The present invention solves the problems of the prior art by providing a safe, reliable, reproducible method for entry into the pericardial sac.

This disclosure together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Now referring to the drawings, the method and system of the present invention provides a solution for the problems of the prior art by providing a safe, reliable, reproducible method for entry into the pericardial sac. In one embodiment, the system includes an outer large bore sheath or needle that provides a guide for a hooking mechanism that engages and grasps the pericardium. With the pericardium secure, it can be drawn away from the heart to create space for penetration through the pericardium for further procedures while reducing risk to the heart itself. In another embodiment the method and system described generally includes penetration of the subcutaneous tissue with a relatively blunt stylet contained within a sheath. The stylet is removed from the sheath and a hook mechanism is installed. Once in contact with the pericardium, the hook is engaged with the pericardial tissue, allowing the hook mechanism to draw the pericardium away from the heart to create a greater space between the heart and pericardium thereby allowing needle insertion into the pericardial cavity in a much safer and controlled manner.

Figure 3:
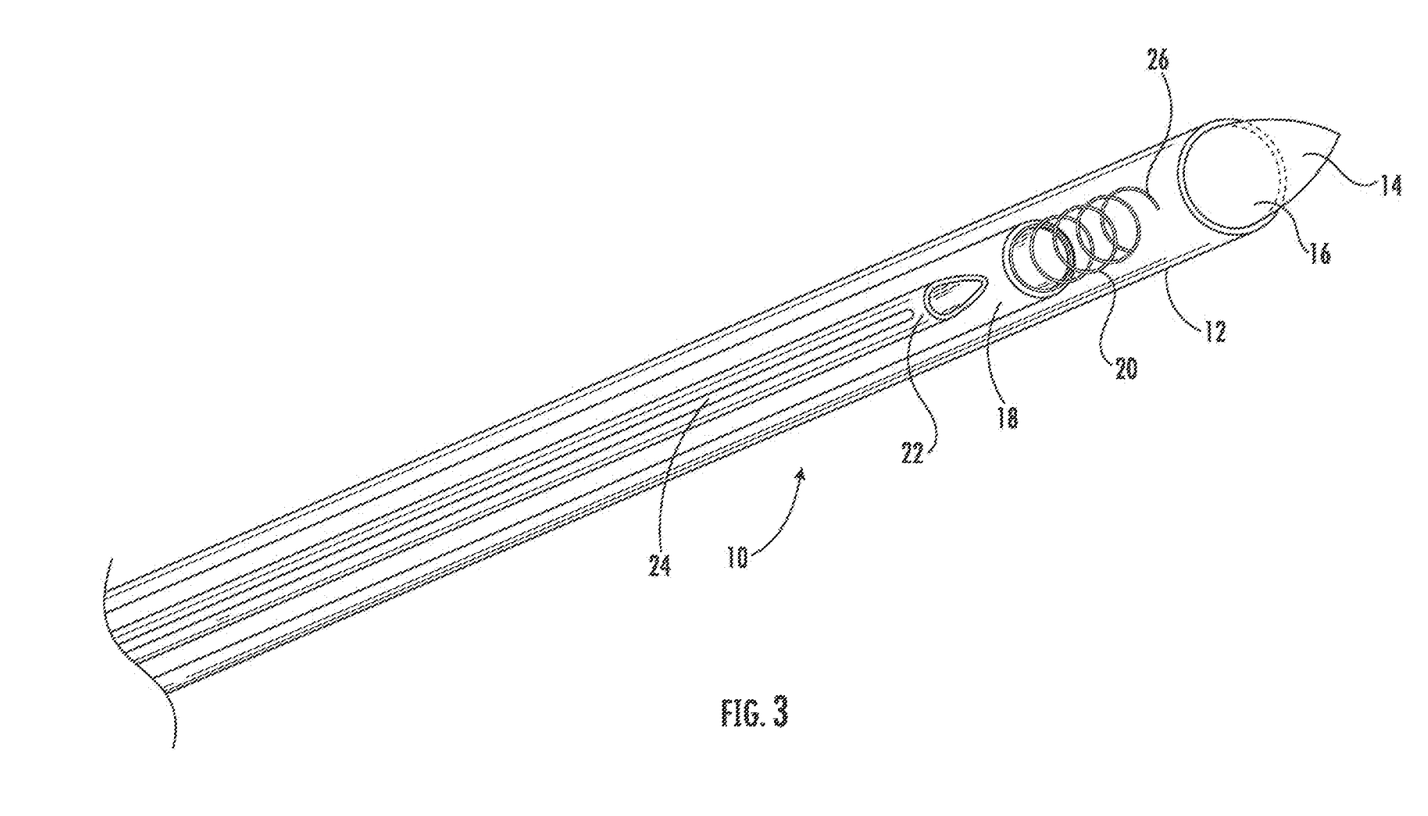
FIG. 3 is a diagrammatic view of an illustrative embodiment of a device in accordance with the teachings of the present invention.
Figure 4:
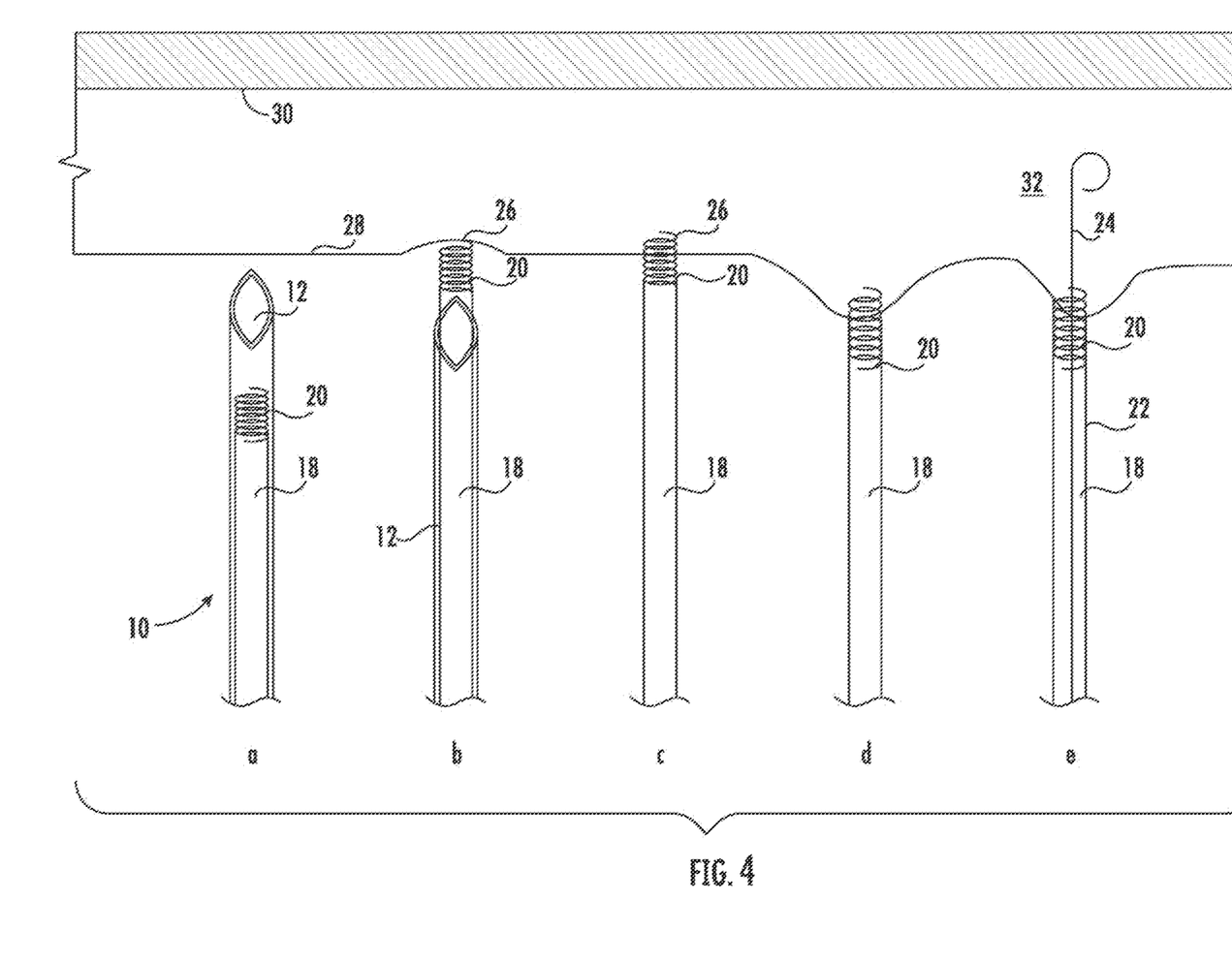
FIG. 4 is a diagrammatic view of a method in accordance with the present disclosure
Figure 5:
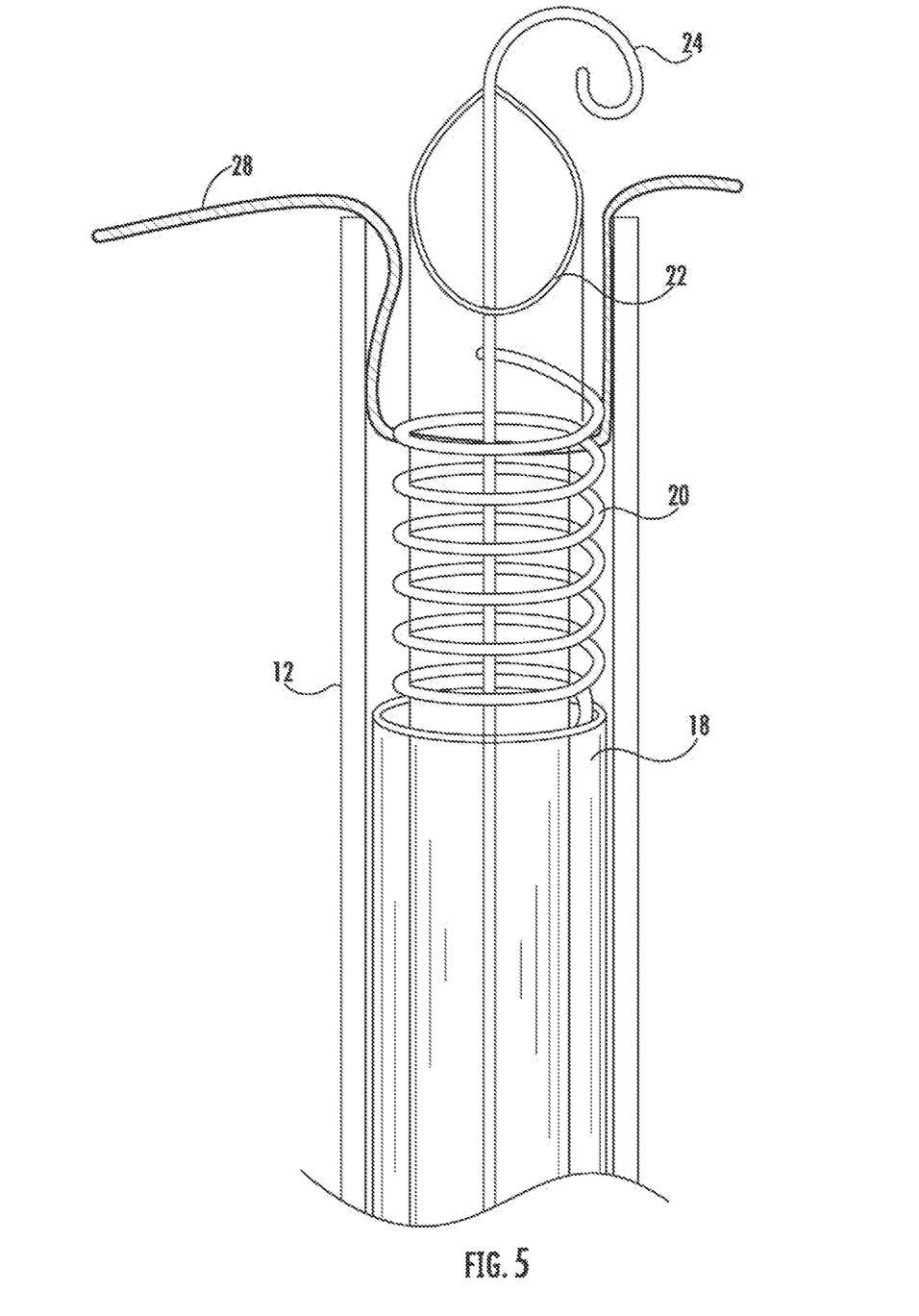
FIG. 5 is an expanded diagrammatic view of an illustrative embodiment of a device in accordance with the teachings of the present invention.

Turning now to FIGS. 3 and 4 in a first exemplary embodiment, a system 10 is provided that generally includes a guide sheath 12 that can have a sharp tip 14 or a relatively blunt tip 16, a hook mechanism 18 includes an engagement member 20 on a proximal end thereof which allows for the pericardium to be engaged in a safe manner and includes a bore thereto guide a large bore needle 22 and optionally a guide wire 24. The hook mechanism preferably includes a hook end 26 that is disposed approximately 90 degrees to the direction that the guide sheath 12 and or the large-bore needle 22 is pointed.

The arrangement of the system 10 is configured such that the possibility for over-penetration through the pericardium by the needle 22 is avoided or significantly minimized by several mechanisms. First, the direction of initial penetration into the pericardium by the hook end 26 is now pointed "sideways" or approximately 90 degrees relative to the plane of entry into the pericardium. Second, the depth of initial penetration is significantly limited to a few millimeters.

Turning now to FIG. 4, the method of using the system 10 of the present disclosure is illustrated. The guide sheath 12 is inserted through the subcutaneous tissue until it is proximate the pericardium 28 as seen at illustration a of FIG. 4. The hook mechanism 18 is then extended from the sheath 12 to allow the hook end 26 of the engagement member 20 to reach the pericardium 28. With slight pressure, the hook end 26 of the engagement member 20 penetrates the pericardium 28 and with a rotation of the hook mechanism the engagement member captures the pericardium as seen at illustration c.

Once the pericardium 28 is securely grasped by the engagement member 20 on the hook mechanism 18, the pericardium 28 can be pulled back, away from the heart 30 to create a greater distance between the heart 30 and the location at the pericardium 28 that is the subsequent needle entry site. As shown at illustration d. Finally, at illustration d the needle 22 can be seen inserted through the pericardium 28 and into the pericardial cavity 32 as well as the insertion of a guide wire 24 for assistance with further procedures. In the manner the system 10 allows entry to the pericardial cavity 32 a much safer, more controlled manner.

In one embodiment, once hooked by the engagement member 20, the pericardium 28 can be grasped and pulled back into a blunt end guide sheath 12. This allows for additional safety in that the pericardial penetration by the large-bore needle 22 can be performed within the confines of the sheath 12. This ensures that the tip of the large-bore needle 22 never leaves the confines of the sheath 12 and therefore remains "safe" at all times. This can be combined with a large bore needle that has a "limiting" mechanism that eliminates the ability of the needle to penetrate beyond the end of the stylet.

Figure 6:
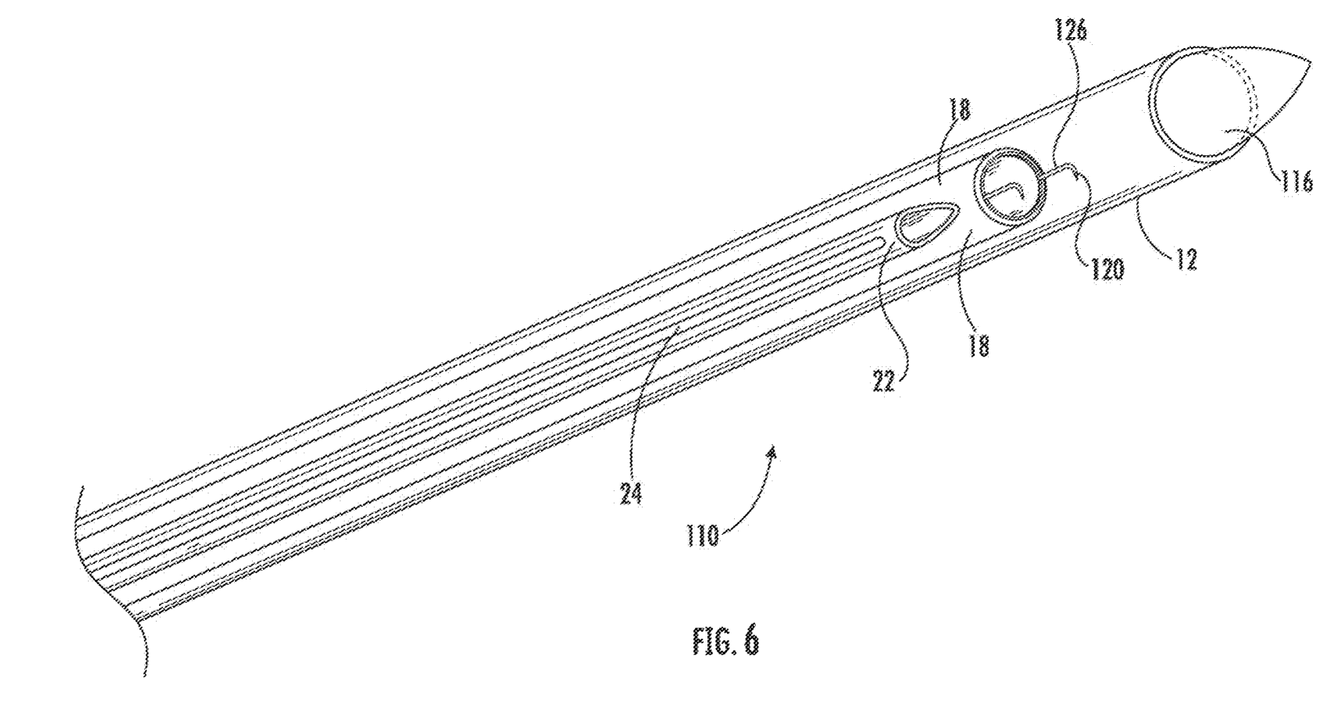
FIG. 6 is a diagrammatic view of an alternate illustrative embodiment of a device in accordance with the teachings of the present invention.

Turning to FIG. 6, an alternate embodiment illustrates the system 110 wherein a blunt plastic or metal tip in the form of a stylet 116 is positioned at the end of the sheath 12. In this manner the blunt stylet 116 is used to deliver the system into contact with the pericardial surface in a manner that penetrates subcutaneous tissues but does not penetrate the pericardial sac itself as the pericardial sac is a much tougher tissue. This can be helpful, especially with imaging, in demonstrating that the system is properly positioned in direct contact with the pericardium.

Further, the hook mechanism 18 is shown to include two engagement members 120 extending from its tip and positioned at approximately a 90-degree angle relative to the direction of insertion with the two hook ends 126 being positioned such that rotation allows them to penetrate and grasp the pericardium.

Figure 7:
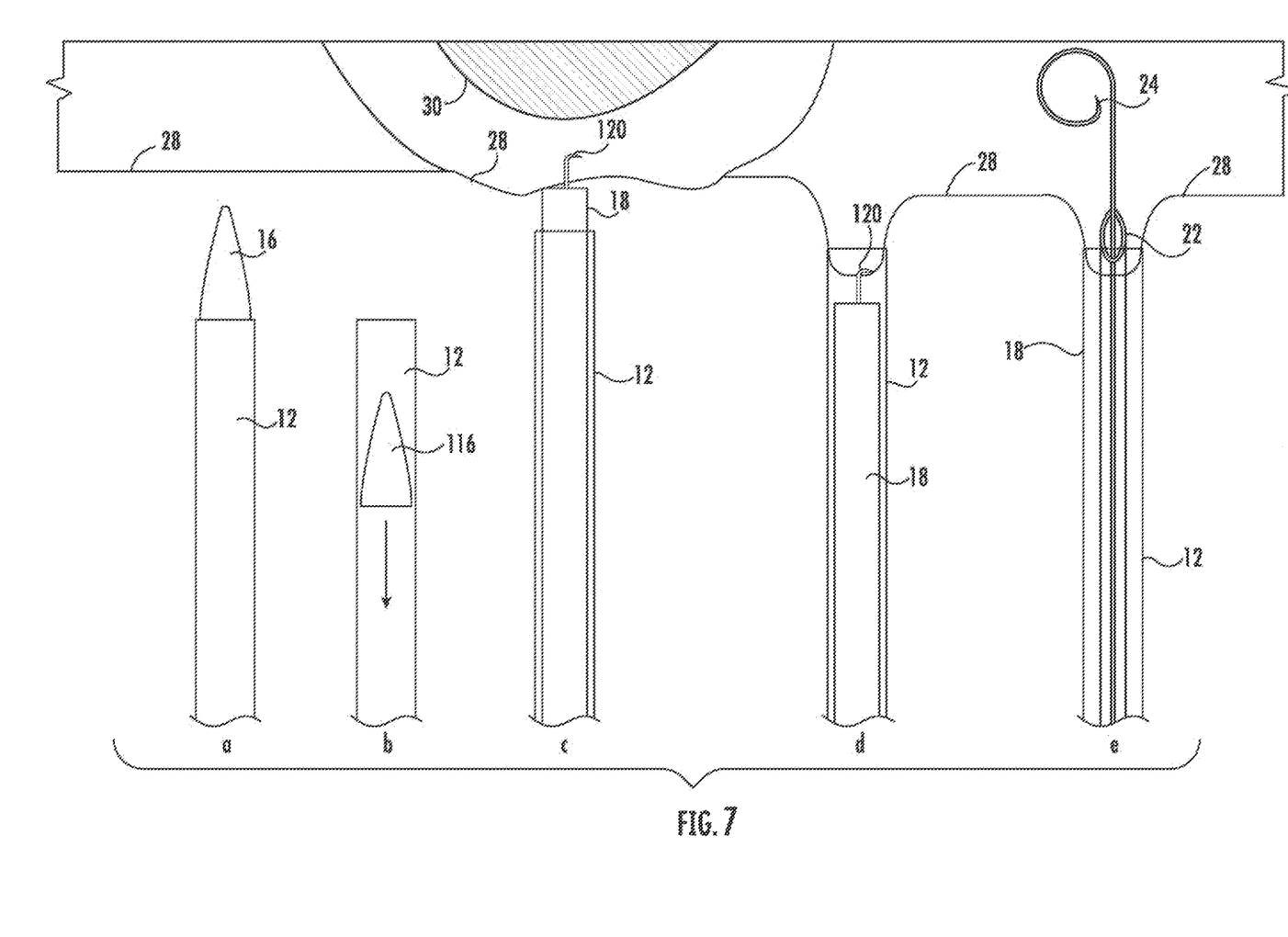
FIG. 7 is a diagrammatic view of an alternate method in accordance with the present disclosure.

As can be seen in FIG. 7 at illustration a, the blunt stylet 116 is used to deliver the system 110 into contact with the pericardial surface in a manner that penetrates subcutaneous tissues but does not penetrate the pericardial sac 28 itself. The blunt tipped stylet 116 is then removed through the existing sheath 12 as shown at illustration b and is exchanged for the hooking mechanism 18 as shown at illustration c. The hooking mechanism 18 is rotated such that the engagement member 120 penetrates grasps the pericardium 28 safely.

Once safely grasped, the pericardium 28 is pulled back away from the heart 30. The pericardium 28 may or may not be pulled partially into the sheath 12 as shown at illustration d, where the large bore needle 22 is introduced, either through the center lumen/cannula of the hooking mechanism 18 or in parallel but adjacent the hooking mechanism but within the sheath 12. Once the needle 22 has been safely introduced through the pericardium 28 as shown in illustration e, a guide wire 24 is placed in standard fashion to allow further procedures.

At this point in the procedure the guide wire 24 can be left positioned within the pericardium 28 while the remaining hardware is removed, and the procedure is completed in standard fashion. Alternatively, if necessary, tension can be maintained on the grasped pericardium to allow for greater space (distance from the heart) with which to work while the drain is placed.

In one embodiment the hooking mechanism may consist of one or several (usually symmetrical) barbs. Alternately there may be one or more helical, corkscrew shaped extensions of the barbs. Still further, the hooking mechanism may be one or more barbs extending from the end of end of the hooking mechanism. Still further the hooking mechanism may have a lumen therein to allow insertion of a large bore needle or may be solid wherein a large bore needle is inserted adjacent thereto within the sheath.

Figure 8:
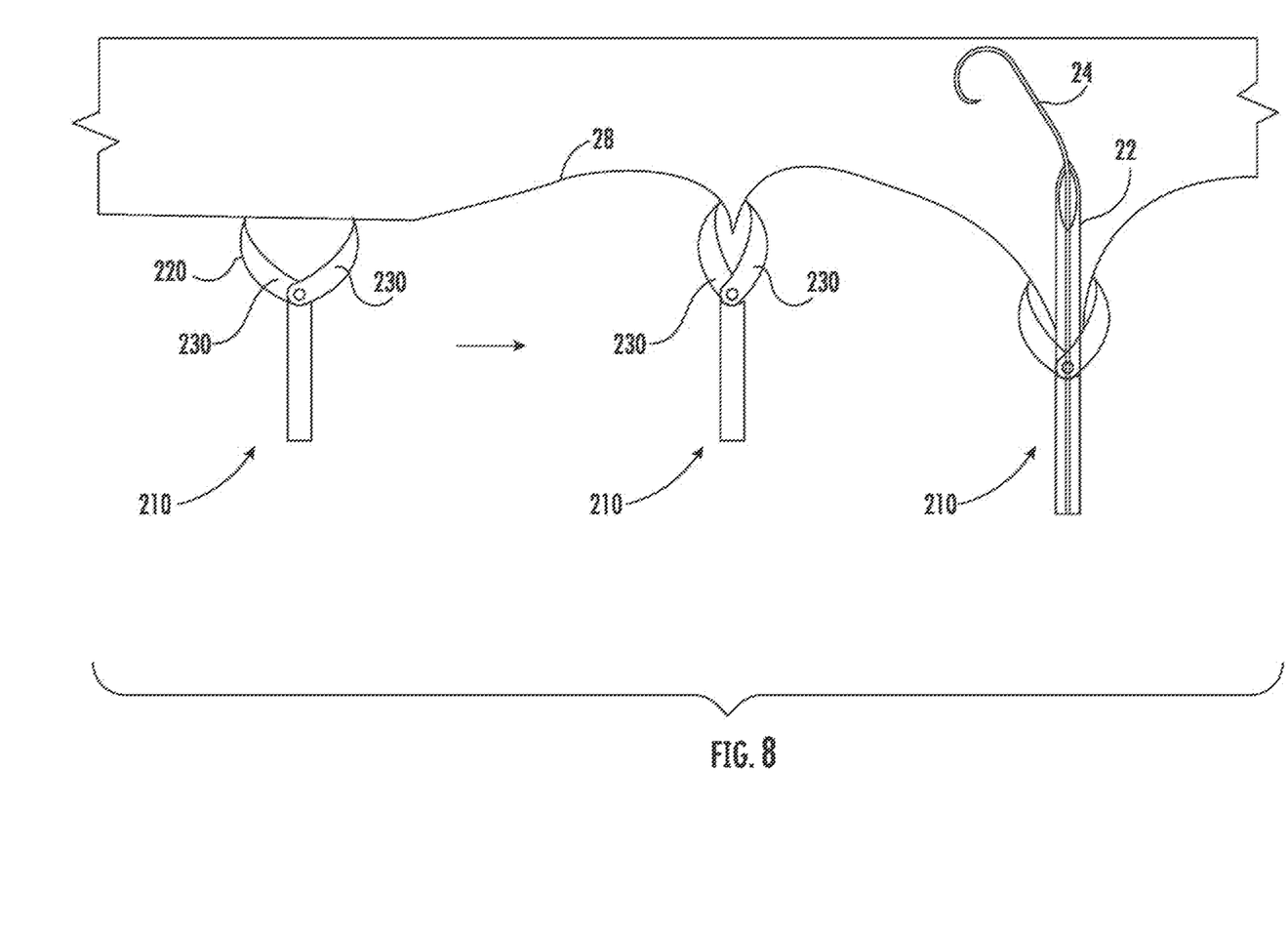
FIG. 8 is a diagrammatic view of an additional alternate illustrative embodiment of a device in accordance with the teachings of the present invention.

Turning to FIG. 8, an alternate embodiment illustrates the system 210 wherein a hooking mechanism 220 is positioned at the end of the sheath. The hooking mechanism is two opposed arms 230 with barbs thereon such that closing the arms 230 relative to one another grasp the pericardium 20. In this manner the grasping arms stabilize pericardial sac to allow delivery of the needle 22 and guide wire 24.

Further, the hook mechanism 18 is shown to include two engagement members 120 extending from its tip and positioned at approximately a 90-degree angle relative to the direction of insertion with the two hook ends 126 being positioned such that rotation allows them to penetrate and grasp the pericardium.

Figure 9:
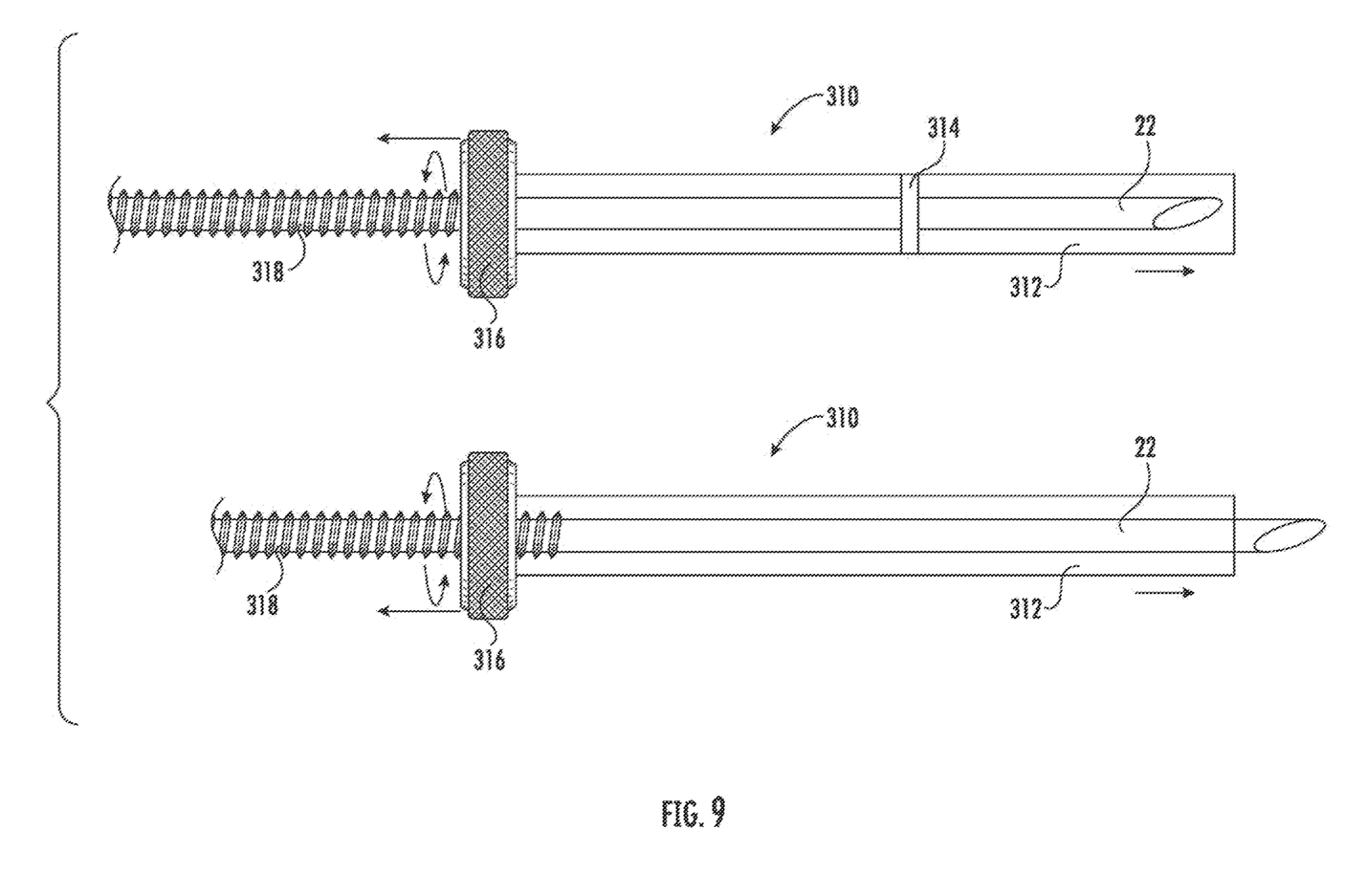
FIG. 9 is a diagrammatic view of an additional alternate illustrative embodiment of a device in accordance with the teachings of the present invention.

Turning to FIG. 9, an embodiment is shown that illustrates the system 310 including an outer sheath 312 with a needle 22 positioned therein. A stabilizer 314 may be employed to maintain the position of the needle 22 within the bore of the sheath 312. When the sheath 312 is positioned adjacent the pericardium a knob 316 can be rotated which engages with threading 318 on the needle 22 causing the needle to advance in a controlled fashion out of the sheath thereby penetrating the pericardium.

Figure 10:
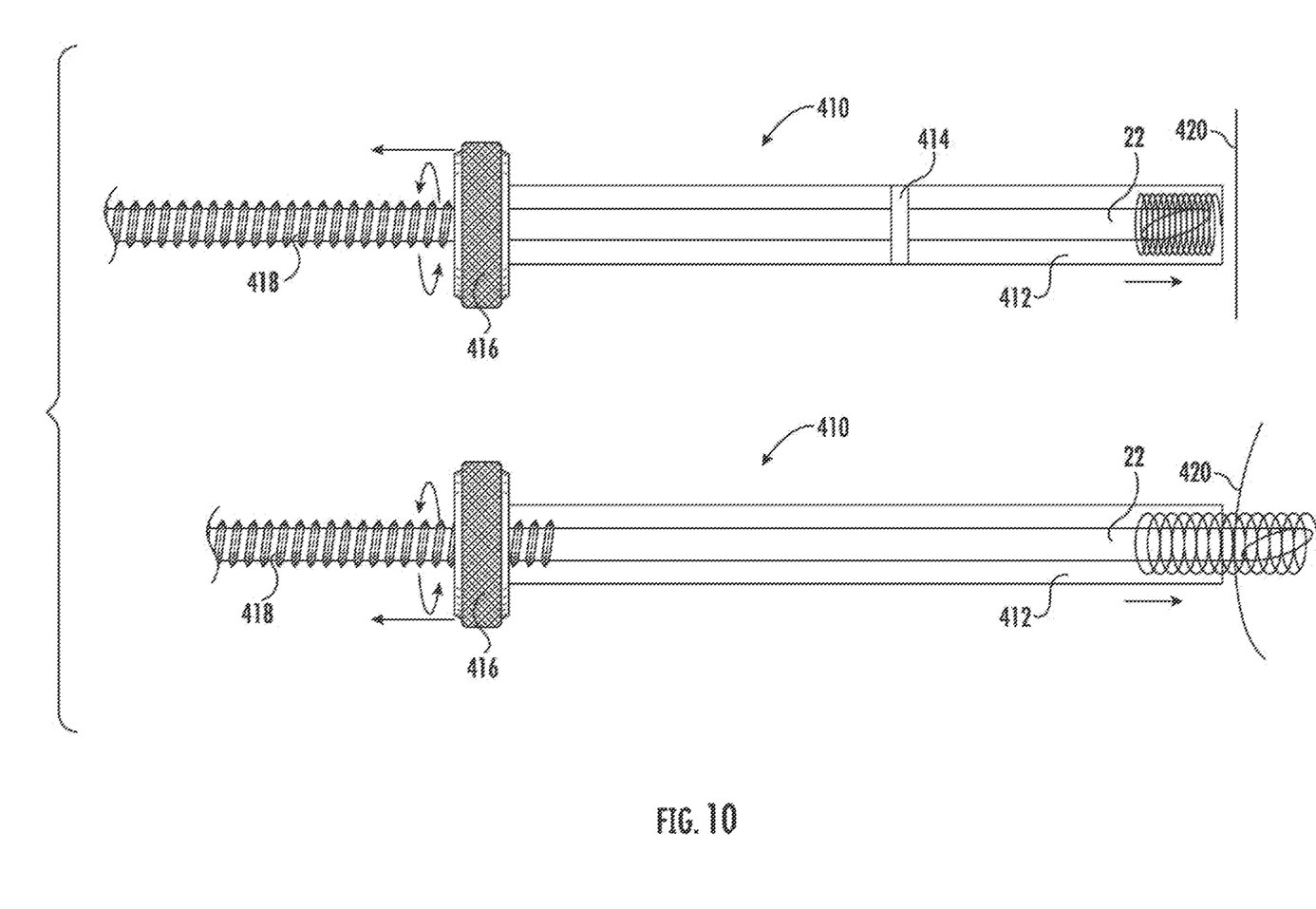
FIG. 10 a diagrammatic view of a further additional alternate illustrative embodiment of a device in accordance with the teachings of the present invention.

Alternately as shown at FIG. 10, an embodiment is shown that illustrates the system 410 including an outer sheath 412 with a needle 22 positioned therein. A grasping mechanism 420 is shown on the end of the sheath. The needle is in a fixed position relative to the sheath while the sheath is rotatable. The grasping mechanism 420 penetrates the pericardium 28 and then the sheath and grasping mechanism are rotated using knob 416 causing the pericardium 28 to be drawn down onto the needle.

In another embodiment, the grasping mechanism may be a corkscrew positioned 90 degrees relative to the to the previous embodiment described.

Figure 11:
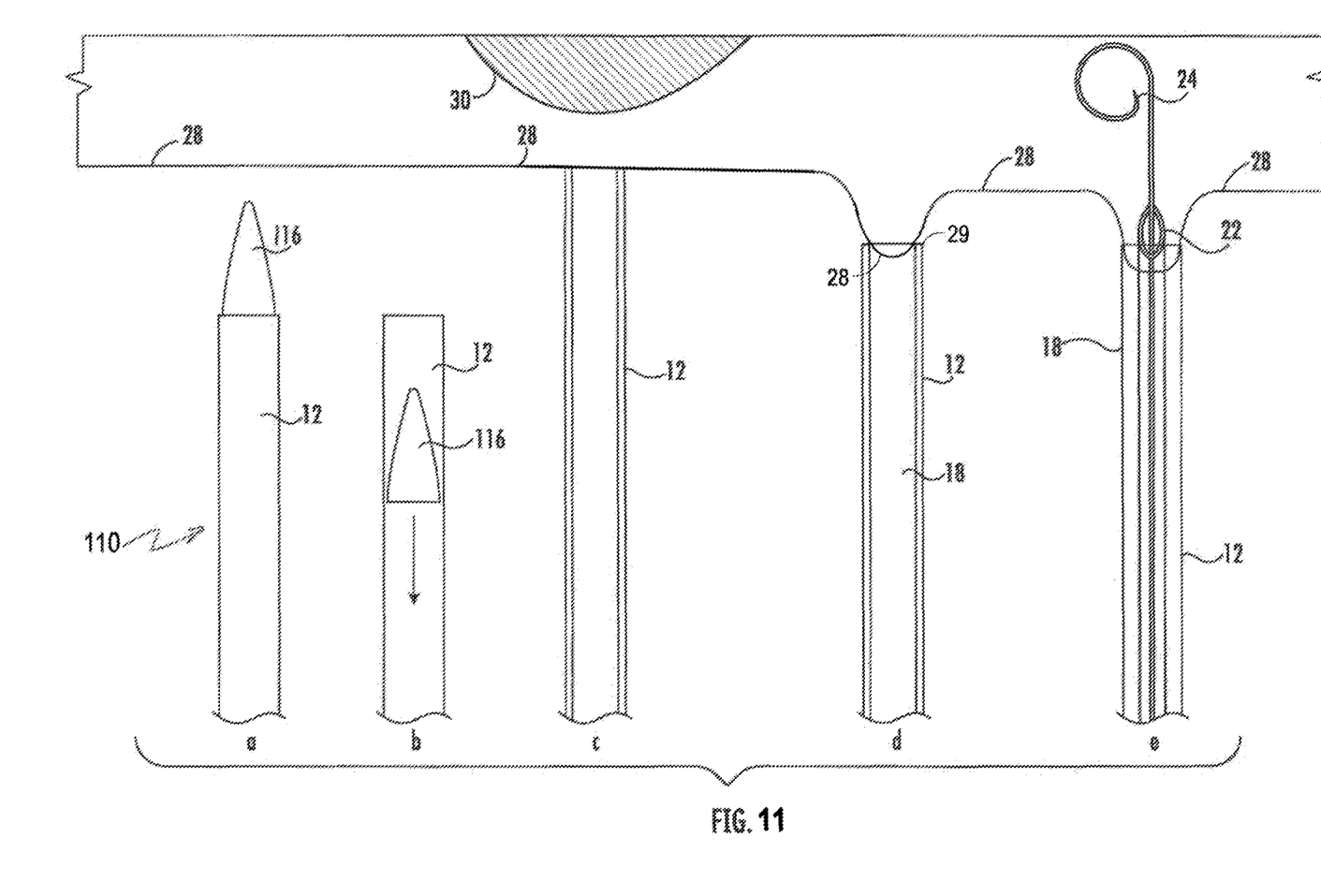
FIG. 11 is a diagrammatic view of an alternate method in accordance with the present disclosure.

As can be seen in FIG. 11 at illustration a, the blunt stylet 116 is used to deliver the system 110 into contact with the pericardial surface in a manner that penetrates subcutaneous tissues but does not penetrate the pericardial sac 28 itself. The blunt tipped stylet 116 is then removed through the existing sheath 12 as shown at illustration b and the sheath 12 is extended into contact with the pericardial sac 28 as shown at illustration c. A vacuum is applied on the lumen of the sheath 12 such that the vacuum engages and grasps the pericardium 28 safely drawing it downwardly into the lumen of the sheath 12 as shown in illustration d. The suction draws the pericardium into a safe zone into the distal end 29 of the sheath 12. In this manner, the pericardium is "grasped" using only suction which is a non-penetrating mechanism. Without a penetrating mechanism that extends beyond the distal end 29 of the sheath 12, the heart cannot be injured. Suction, itself, will not be able to affect the heart, only the outside of the pericardium.

Once safely grasped, the pericardium 28 is pulled back away from the heart 30. The pericardium 28 may or may not be pulled partially into the sheath 12 as shown at illustration d, where the large bore needle 22 is introduced, through the center lumen/cannula of the sheath 12. Once the needle 22 has been safely introduced through the pericardium 28 as shown in illustration e, a guide wire 24 is placed in standard fashion to allow further procedures.

At this point in the procedure the guide wire 24 can be left positioned within the pericardium 28 while the remaining hardware is removed, and the procedure is completed in standard fashion. Alternatively, if necessary, tension can be maintained on the grasped pericardium to allow for greater space (distance from the heart) with which to work while the drain is placed.

It can therefore be seen that the present disclosure provides a unique solution to the problem of safe percutaneous entry into the pericardial sac. For these reasons, the present disclosure is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A system for safe entry to a pericardial membrane, comprising:
    an outer guide sheath with at least one lumen therein, the outer guide having a blunt distal end and a blunt distal end surface, said lumen extending through said outer guide sheath and having an opening in the blunt distal end surface of said outer guide sheath;

a blunt stylet configured to be selectively extended through and removed from the lumen for penetrating subcutaneous tissue and positioning the blunt distal end surface of the outer guide sheath adjacent the pericardial membrane;

a means of drawing suction within said at least one lumen, said suction engaging said pericardial membrane when said blunt distal end surface of said outer guide sheath is in contact with said pericardial membrane, said suction grasping said pericardial membrane and drawing said pericardial membrane into a safe zone within the blunt distal end of the outer guide sheath; and a large bore needle configured to be selectively inserted within at least one lumen of said outer guide sheath for selectively penetrating the pericardial membrane along a long axis of the outer guide sheath, and wherein the blunt distal end surface of the guide sheath and suction cooperate to provide a uniform annular tension on the pericardial membrane to facilitate piercing of the pericardial membrane.

2. The system of claim 1, further comprising a guide wire configured to be selectively inserted with said large bore needle.

* * * * *